United States Patent Office 2,904,548
Patented Sept. 15, 1959

2,904,548

N-SUBSTITUTED-3-AZABICYCLO [3:3:0] OCTANE-2,4-DIONES AND SALTS THEREOF

Leonard M. Rice, Baltimore, Md., and Charles H. Grogan, Falls Church, Va., assignors to The Geschickter Fund for Medical Research, Inc., Washington, D.C., a corporation of New York No Drawing. Application January 28, 1957
Serial No. 636,469

11 Claims. (Cl. 260—247.1)

This invention relates to compositons of matter, particularly to chemo-therapeutic organic componds that are also of value as synthetic and pharmaceutical intermediates in preparing other chemo-therapeutic agents. More particularly the invention relates to compounds possessing bronchiodilatory, antispasmodic and local anesthetic properties in varying degrees.

Specifically this invention relates to dialkylaminoalkyl imides and heterocyclic aminoalkyl imides of 1,2-cis-cyclopentane dicarboxylic anhydride, their simple and quaternary salts.

It is a basic object of the present invention to provide novel organic compounds and methods for the preparation thereof.

It is another object of the invention to provide novel, physiologically active compounds characterized by chemo-therapeutic or medicinal properties, particularly bronchiodilatory, antispasmodic and local anesthetic activity.

These and other objects and the manner in which they are accomplished will become apparent to those conversant with the art from the following description of the general class of compounds and certain specific examples of particular members thereof as well as general and specific methods of their preparation.

Generally stated, the novel compounds discovered are obtained by reacting the appropriate dialkylaminoalkylamine or heterocyclic aminoalkyl amine with the anhydride of 1,2-cis-cyclopentane dicarboxylic acid to form the intermediate amic acid wihch is cyclized to the imide by heating for 2 hours at 170–180° C. The imides are isolated directly from the reaction mixture by vacuum distillation and may be then converted to acid addition or quaternary salts by reaction with an acid, an alkyl halide or an alkyl sulfate such as dimethyl sulfate, methyl hydrogen sulfate, or methyl tolulene sulphate, respectively, in suitable media.

Formula I shows the general structural formula of compounds obtained by the methods hereafter more particularly described.

Formula I

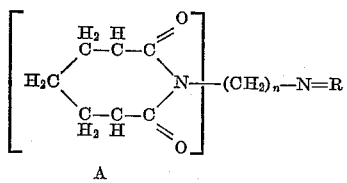

This formula illustrates the imides and for convenience in presentation the azabicyclooctanedione nucleus (enclosed in parenthesis, Formula I) will be designated by the letter A hereafter.

The acid addition salts of these imides, formed on the side chain nitrogen are illustrated by Formula II, and the monoquaternary salts, likewise formed on the side chain nitrogen are illustrated by Formula III.

Formula II

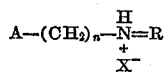

Formula III

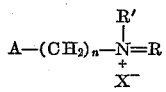

In these formulae A represents the azabicyclooctane-dione nucleus, $n$ a number from 1 to 6, R represents 2 alkyl groups with from 1 to 6 carbon atoms, and R' an alkyl group with from 1 to 6 carbon atoms or an alkenyl group containing 3 to 6 carbon atoms, such as the allyl radical. The structure (N=R) may represent a heterocyclic ring namely, morpholine, piperidine, pyrrolidine, piperazine or N-methyl piperazine. $X^-$ represents an anion, such as chloride, iodide, bromide, acetate, sulfate, hydrogen sulfate, methyl sulfate, tolulene sulphate, mucate, and theophyllinate. In the quaternary salts R' may be the same as or different from R in any of the formulae given.

The compounds of the invention, the imides and the salts thereof, are therapeutically useful as bronchiodilatory and antispasmodic agents and as local anesthetics.

Also, the imides of the invention are useful as intermediates in that they may be reduced, as with lithium aluminum hydride, to the N-dialkylaminoalkyl-3-azabicyclooctane [3:3:0] bases and N-heterocyclicaminoalkyl-3-azabicyclooctane [3:3:0] bases described and claimed in our copending application Serial No. 636,511 filed concurrently herewith.

The following examples of specific compounds and methods of their preparation will illustrate the manner in which they are obtained by the application of the general synthesizing procedure to particular members of the class of compounds discovered. It will be understood, however, that the following examples are merely illustrative and are not, nor are they intended to be, exhaustive of all the compounds embraced by this invention.

EXAMPLE I

N-dimethylaminoethyl-3-azabicyclo [3:3:0] octane-2,4-dione, acid addition salts and quaternary salts 0.2 mole (28 gm.) of 1,2-cis-cyclopentane dicarboxylic anhydride was weighed into a 50 ml. 24/40 flask and 0.2 mole (17.6 gm.) of dimethylaminoethylamine was added rapidly in one lot. An exothermic reaction took place and the mass soon liquefied. It was stirred until homogeneous (or heated if necessary to obtain a homogeneous liquid phase) and reweighed. Any amine lost (usually none) was replaced and a 1–2% excess of amine added. The reaction mixture was stirred until again homogeneous and heated slowly to 170–180° C. It was maintained at this temperature until water was no longer evolved (usually 2 hours) to cyclize the amic acid initially formed to the imide. Following the heating period, the flask was connected directly to a vacuum distillation apparatus and heated slowly to the boiling point so as to remove any lower boiling material such as unreacted amine. The material was distilled and the whole distilled between 93–98° C. at 0.3 mm. as a clear colorless oily liquid weighing 35.2 gm., $n_D^{20}$=1.4958.

| Analysis | Percent Carbon | Percent Hydrogen | Percent Nitrogen |
|---|---|---|---|
| Calculated | 62.83 | 8.63 | 13.32 |
| Found | 63.07 | 8.85 | 13.40 |

*The monohydrochloride.*—This was obtained as a white crystalline material by adding an excess of an ethanol solution of HCl to the imide dissolved in a minimum amount of isopropanol and precipitation with anhydrous ether. It had a melting point of 198–199° C. Recrystallization from isopropanol gave a melting point of 199–199.5° C.

Ionic chloride: Calculated — 14.37%. Found — 14.35%.

*The monomethiodide.*—The monomethiodide was obtained as a white crystalline material by adding a slight excess of methyl iodide to the imide dissolved in acetone. It melted at 179–181° C. Recrystallization from absolute ethanol increased the melting point to 180–181° C.

Ionic iodide: Calculated—36.03%. Found—36.07%.

EXAMPLE II

*N-diethylaminoethyl-3-azabicyclo [3:3:0] octane 2,4-dione, acid addition and quaternary salts*

*The imide.*—This imide was prepared in a manner analogous to that detailed under Example I by the reaction of 0.2 mole of diethylaminoethylamine with 0.2 mole of the anhydride. On vacuum distillation 39 grams of a colorless oily liquid, B.P. 105–115° C./0.3 mm. was obtained. $n_D^{20}=1.4930$.

| Analysis | Percent Carbon | Percent Hydrogen | Percent Nitrogen |
|---|---|---|---|
| Calculated | 65.51 | 9.31 | 11.76 |
| Found | 65.56 | 9.55 | 11.51 |

*The monohydrochloride.*—This was obtained from the imide as detailed under Example I as a white crystalline material, M.P. 181–183° C. The material crystallized from ethyl acetate isopropanol, M.P. 183–185° C.

Ionic chloride: Calculated—12.90%. Found—13.23%.

*The monomethiodide.*—Obtained from the imide as detailed under Example I as an oil which would not crystallize.

EXAMPLE III

*N-dimethylaminopropyl-3-azabicyclo [3:3:0] octane-2,4-dione, acid addition quaternary salts*

*The imide.*—Reaction of 0.2 mole of dimethylaminopropylamine with 0.2 mole of the anhydride as detailed under Example I yielded 37.2 grams of the title imide, B.P. 87–90° C./0.1 mm. $n_D^{20}=1.4940$.

| Analysis | Percent Carbon | Percent Hydrogen | Percent Nitrogen |
|---|---|---|---|
| Calculated | 64.25 | 8.99 | 12.49 |
| Found | 64.48 | 9.13 | 12.22 |

*The monohydrochloride.*—This was formed from the imide in isopropanol with alcoholic-HCl and precipitation with anhydrous ether as a white crystalline material, M.P. 168–169° C. Recrystallization from isopropanol, M.P. 173–174° C.

Ionic chloride: Calculated—13.60%. Found—13.70%.

*The monomethiodide.*—Obtained from the imide as detailed under Example I as a white crystalline material, M.P., 230–232° C. One recrystallization yielded material M.P. 230–231° C.

Ionic iodine: Calculated—34.65%. Found—34.61%.

EXAMPLE IV

*N-diethylaminopropyl-3-azabicyclo [3:3:0] octane-2,4-dione, acid addition and quaternary salts*

*The imide.*—Reaction of 0.1 mole of diethylaminopropylamine with 0.1 mole of the anhydride as detailed under Example I yielded 23 grams of the title imide, B.P. 108–113° C./0.08 mm.: $n_D^{20}=1.4908$.

| Analysis | Percent Carbon | Percent Hydrogen | Percent Nitrogen |
|---|---|---|---|
| Calculated | 66.63 | 9.59 | 11.10 |
| Found | 66.87 | 9.54 | 11.57 |

*The monohydrochloride.*—This was formed from the imide in isopropanol with an excess of alcoholic-HCl and precipitation with ether, M.P. 122–124° C. not changed on recrystallization.

Ionic chloride: Calculated—12.28%. Found—12.56%.

*The monomethiodide.*—This was formed from the imide in acetone with a slight excess of methyl iodide, M.P. 114–115° C. after 2 recrystallizations.

Ionic iodide: Calculated—32.18%. Found—32.02%.

EXAMPLE V

*N-morpholinopropyl-3-azabicyclo [3:3:0] octane 2,4-dione, acid addition and quaternary salts*

*The imide.*—This was formed by reaction of 0.1 mole of morpholinopropylamine with 0.1 mole of the anhydride as detailed under Example I. Obtained 24 grams B.P. 145–155° C./0.08 mm.: $n_D^{20}=1.5115$.

| Analysis | Percent Carbon | Percent Hydrogen | Percent Nitrogen |
|---|---|---|---|
| Calculated | 63.13 | 8.33 | 10.52 |
| Found | 63.59 | 8.16 | 10.47 |

*The monohydrochloride.*—This was formed from the imide in isopropanol with excess alcoholic-HCl and was a white crystalline material, M.P. 183–184° C. Recrystallized from isopropanol-ethyl ether, M.P. 184–185° C.

Ionic chloride: Calculated—11.71%. Found—11.66%.

*The monomethiodide.*—This was formed from the imide in acetone with a slight excess of methyl iodide, and was a white crystalline material, M.P. 170–172° C. with decomposition. Recrystallized from isopropanol, M.P. 201–202° C.

Ionic iodide: Calculated—30.97%. Found—31.08%.

While the preparation of the hydrochloride acid addition salt has been illustrated in the examples, other acid addition salts such as the hydrobromide, hydroiodide, acetate, sulfate, mucate, and theophyllinate may be prepared in a manner similar to the illustrated preparation of the hydrochloride.

Similarly, while the preparation of the methiodide quaternary salt has been illustrated in the examples, other quaternary salts such as the methochloride, methobromide, dimetho-sulfate, metho-hydrogen sulfate, and metho-toluene sulfate may be prepared in a manner similar to the illustrated preparation of the methiodide.

To form the quaternary salts where the anion is acetate, mucate, theophyllinate and other weak acid anions, the quaternary halide may be first formed and then treated with silver oxide or an ion exchange resin to remove the halide. The free quaternary base hydroxide is next neutralized with the appropriate weak acid such as acetic, mucic, theophyllin, etc.

From the foregoing description of a novel class of compounds, details of preparation and characterization of exemplary members of the class, it will be understood that, on the basis of the discovery and knowledge disclosed herein, other specific compounds can be made and variations in the methods of synthesis resorted to. The following table contains additional examples of imides prepared by the procedures detailed herein.

N-DIETHYLAMINOHEXYL-3-AZABICYCLO [3:3:0] OCTANE 2,4-DIONE

[B.P. 128–134° C. at 0.1 mm.]

|            | Percent Carbon | Percent Hydrogen | Percent Nitrogen |
|------------|----------------|------------------|------------------|
| Calculated | 69.35          | 10.27            | 9.52             |
| Found      | 69.08          | 10.52            | 9.43             |

N-DIHEXYLAMINOETHYL-3-AZABICYCLO [3:3:0] OCTANE-2,4-DIONE

[B.P. 134–144° C. at 0.1 mm.]

|            | Percent Carbon | Percent Hydrogen | Percent Nitrogen |
|------------|----------------|------------------|------------------|
| Calculated | 71.95          | 10.93            | 7.99             |
| Found      | 71.83          | 11.01            | 8.05             |

N-PIPERIDINOETHYL-3-AZABICYCLO [3:3:0] OCTANE-2,4-DIONE

[B.P. 138°–142° C. at 0.2 mm. pressure.]

|            | Percent Carbon | Percent Hydrogen | Percent Nitrogen |
|------------|----------------|------------------|------------------|
| Calculated | 67.17          | 8.86             | 11.19            |
| Found      | 67.09          | 9.02             | 11.00            |

N-PYRROLIDINOETHYL-3-AZABICYCLO [3:3:0] OCTANE-2,4-DIONE

[B.P. 134°–139° C. at 0.2 mm. pressure.]

|            | Percent Carbon | Percent Hydrogen | Percent Nitrogen |
|------------|----------------|------------------|------------------|
| Calculated | 66.07          | 8.53             | 11.86            |
| Found      | 66.02          | 8.56             | 11.77            |

The specific compounds and methods disclosed herein are to be considered in all respects as illustrative and not restrictive, the scope of the discovery being indicated by the appended claims rather than the foregoing descriptive detailed examples, and all specific compounds and variations and methods which come within the meaning and range of equivalency of the claims are therefore intended to be embraced therein.

What is claimed and desired to be secured by United States Letters Patent is:

1. As a novel composition of matter, a compound selected from the group consisting of (1) N-substituted derivatives of 3-azabicyclo [3:3:0] octane-2, 4-diones having the general formula

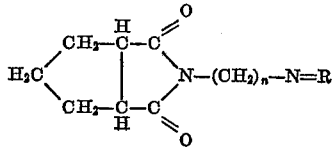

where in said formula, $n$ is a number from 1 to 6, and R is selected from the group consisting of two alkyl groups with each alkyl group having from 1 to 6 carbon atoms and a radical forming together with the nitrogen atom to which it is attached, a heterocyclic group selected from the group consisting of morpholino, piperidino, piperazino, methylpiperazino and pyrrolidino, and (2) acid addition salts and quaternary salts of (1).

2. As a novel composition of matter, a methonium salt of N-dimethylaminoethyl-3-azabicyclo [3:3:0] octane-2,4-dione.

3. As a novel composition of matter, a methonium salt of N-diethylaminoethyl-3-azabicyclo [3:3:0] octane-2,4-dione.

4. As a novel compoistion of matter, a methonium salt of N-dimethylaminopropyl-3-azabicyclo [3:3:0] octane-2,4-dione.

5. As a novel composition of matter a methonium salt of N-diethylaminopropyl-3-azabicyclo [3:3:0] octane-2,4-dione.

6. As a novel composition of matter, a methonium salt of N-morpholinopropyl-3-azabicyclo [3:3:0] octane-2,4-dione.

7. As a novel composition of matter, N-dimethylaminoethyl-3-azabicyclo [3:3:0] octane-2,4-dione.

8. As a novel composition of matter, the methonium chloride of N-dimethylaminoethyl-3-azabicyclo [3:3:0] octane-2,4-dione.

9. As a novel composition of matter, N-dimethylaminopropyl-3-azabicyclo [3:3:0] octane-2,4-dione.

10. As a novel composition of matter, the methonium chloride of N-dimethylaminopropyl-3-azabicyclo [3:3:0] octane-2,4-dione.

11. As a novel composition of matter, N-diethylaminoethyl-3-azabicyclo [3:3:0] octane-2,4-dione.

References Cited in the file of this patent

UNITED STATES PATENTS

| 2,541,211 | Cusic et al. | Feb. 13, 1951 |
| 2,743,270 | Blicke | Apr. 24, 1956 |
| 2,745,836 | Suter | May 15, 1956 |
| 2,784,199 | Grogan et al. | Mar. 5, 1957 |
| 2,786,834 | Grogan et al. | Mar. 26, 1957 |
| 2,802,004 | Grogan et al. | Aug. 6, 1957 |

FOREIGN PATENTS

| 1,108,117 | France | Aug. 24, 1955 |